(12) United States Patent
Schaenzer et al.

(10) Patent No.: US 6,205,849 B1
(45) Date of Patent: Mar. 27, 2001

(54) GLIDE HEAD USING AN ION ETCHED AIR BEARING

(75) Inventors: Mark J. Schaenzer, Eagan; Zine-Eddine Boutaghou, Vadnais Heights, both of MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/129,571

(22) Filed: Aug. 5, 1998

Related U.S. Application Data
(60) Provisional application No. 60/055,915, filed on Aug. 18, 1997.

(51) Int. Cl.[7] .......................................... G11B 5/60
(52) U.S. Cl. .............................................. 73/105
(58) Field of Search ................... 73/105, 12.09; 324/212

(56) References Cited

U.S. PATENT DOCUMENTS

| | | | |
|---|---|---|---|
| 3,197,751 | 7/1965 | Felts | 340/174.1 |
| 3,573,768 | 4/1971 | Harris | 340/174.1 |
| 3,678,482 | 7/1972 | Billawala | 340/174.1 |
| 4,802,042 | 1/1989 | Strom | 360/103 |
| 5,267,109 | 11/1993 | Chapin | 360/103 |
| 5,299,079 | 3/1994 | Kuroda | 360/103 |
| 5,317,465 | 5/1994 | Chapin et al. | 360/103 |
| 5,423,207 | * 6/1995 | Flechsig et al. . | |
| 5,513,056 | 4/1996 | Kawasaki et al. | 360/103 |
| 5,963,396 | * 10/1999 | Burga et al. . | |
| 5,980,369 | * 11/1999 | Burga et al. . | |

OTHER PUBLICATIONS

Research Disclosure 25946, Nov. 1985.

* cited by examiner

Primary Examiner—Robert Raevis
(74) Attorney, Agent, or Firm—Westman, Champlin & Kelly, P.A.

(57) ABSTRACT

A glide head for determining surface characteristics of a material includes a body positioned proximate to the surface of the material and an impact edge, formed through ion etching, that extends from the body toward the material. A sensor is mounted on the body and is capable of sensing impacts between the impact edge and portions of the surface of the material.

17 Claims, 4 Drawing Sheets

GLIDE HEAD USING AN ION ETCHED AIR BEARING

REFERENCE TO CO-PENDING APPLICATION

This application claims priority benefits from U.S. provisional application 60/055,915 entitled "IMPROVED GLIDE HEAD USING AN ION ETCHED AIR BEARING AND ALTERNATIVE SUBSTRATES" filed on Aug. 18, 1997.

BACKGROUND OF THE INVENTION

The present invention relates to systems for analyzing rotating recording discs. More specifically, the present invention relates to glide heads for analyzing the surface of a rotating recording disc.

In data processing systems, magnetic disc drives are often used as data storage devices. In such devices, read/write heads are used to write data on or read data from a rotating hard or flexible disc. When writing information to the disc, the write head generates a magnetic field that changes the magnetic moment of a small localized area on the disc. The size of the small localized area partially determines the data density for the disc. In general, write heads that fly closer to the disc create smaller localized areas and as such increase the amount of data stored on the disc.

In order to minimize fly height and thus maximize data density, discs must be produced under strict tolerances. For example, a disc must be free of defects or "asperities" that extend above the general surface of the disc; the data zones of the disc must have an average roughness or irregularity in the surface that meets certain fixed guidelines; and, the landing zone in the disc, the area of the disc where the head comes to rest when the disc is not spinning, must have a sufficient roughness so that the head does not stick to the surface. If the landing zone is too smooth, the smooth surface of the head will partially bond to the landing zone making it difficult to lift the head when the disc begins spinning.

To determine the average roughness of the disc both inside and outside of the landing zone, a glide head is flown over the disc to perform a test known as glide avalanche. The speed of the disc is reduced until the glide head begins to make nearly constant contact with the disc. This contact is determined by a sensor that is embedded on the glide head. In some cases, the sensor is a piezoelectric device that generates an electrical signal when it is mechanically deformed. In other instances, the sensor is a magneto-resistive head element, which experiences a change in its resistance due to the heat generated by the contact between the glide head and the surface. Based on the electrical signals provided by either type of sensor, it is possible to determine when the glide head experiences nearly constant interference from the surface of the disc. At this point, the height of the glide head is measured using a laser interferometer. This glide height then provides a measure of the roughness of the disc both within the landing zone and within the data zone of the disc.

To determine the number of defects on the disc and their location, the glide head is generally flown a fixed distance above the disc, for example one microinch. At this height, the glide head flies freely over the surface of the disc and only experiences periodic interference from asperities or defects on the disc. When the glide head impacts an asperity, the sensor conveys the impact through an electrical signal, and the asperity is thus recorded.

In the test for determining the roughness of the disc and the test for detecting asperities on the disc, it is preferred that the glide head have a very sharp and even impact edge. The impact edge is the portion of the glide head that is closest to the surface as the glide head flies over the disc. As such, the tests measure interference between the impact edge and the surface of the disc. By having a very even edge, there is less likelihood that an individual asperity will pass through a gap in the edge. In addition, an even and sharp edge maximizes the likelihood that the entire edge comes into contact with the surface during glide avalanche testing. This improves the determination of average roughness by providing a sharper interference signal.

Although it is desirable to have a sharp and even impact edge for testing, the tests tend to destroy this edge. Specifically, each of the tests requires that the impact edge of the glide head come into contact with the surface. As a result, the impact edge experiences a large number of impacts with the surface that cause damage to the edge such as liftouts, where large chunks of edge material are removed from the edge. After a period of testing, the impact edge becomes so damaged, that it can no longer be used to determine the characteristics of a disc surface. At this point, the glide head must be replaced.

The susceptibility of the impact edge to damage is increased by the fact that prior art impact edges are formed through abrasive techniques such as diamond grinding. These abrasive techniques tend to introduce a large amount of stress into the areas of the glide head surrounding the impact edge. These grinding techniques are used because they do not require the large capital investment associated with other techniques that have been used to shape advanced read/write heads. In particular, diamond grinding is much less expensive than photolithography techniques, which require a "clean room".

The impact edges of existing glide heads are also susceptible to damage because of the materials they are made from. In particular, existing glide heads are constructed from a composite material of alumina oxide with titanium carbide ($AL_2O_3TiC$). Such multi-phase materials are susceptible to non-uniform wear and chipping.

SUMMARY OF THE INVENTION

A glide head for determining surface characteristics of a material includes a body to be positioned proximate to the surface of the material and an impact edge, formed through ion etching, that extends from the body toward the material. A sensor is mounted on the body and is capable of sensing impacts between the impact edge and portions of the surface of the material.

In preferred embodiments, the ion etching is performed on a rail extending from the body. The etching produces a step where one of the rail surfaces connected to the impact edge is perpendicular to a surface of the body.

Preferably, the impact edge is parallel to the general plane of the surface of the material being characterized.

By ion etching the impact edge, the present invention reduces stress surrounding the impact edge thereby improving the resilience of the impact edge to impacts.

BRIEF DESCRIPTION OF THE DRAWINGS

FIGS. 5-1 through 5-6 are side views of the glide head of the present invention showing the method of manufacturing the glide head.

DETAILED DESCRIPTION OF THE PREFERRED EMBODIMENTS

Figure 1:
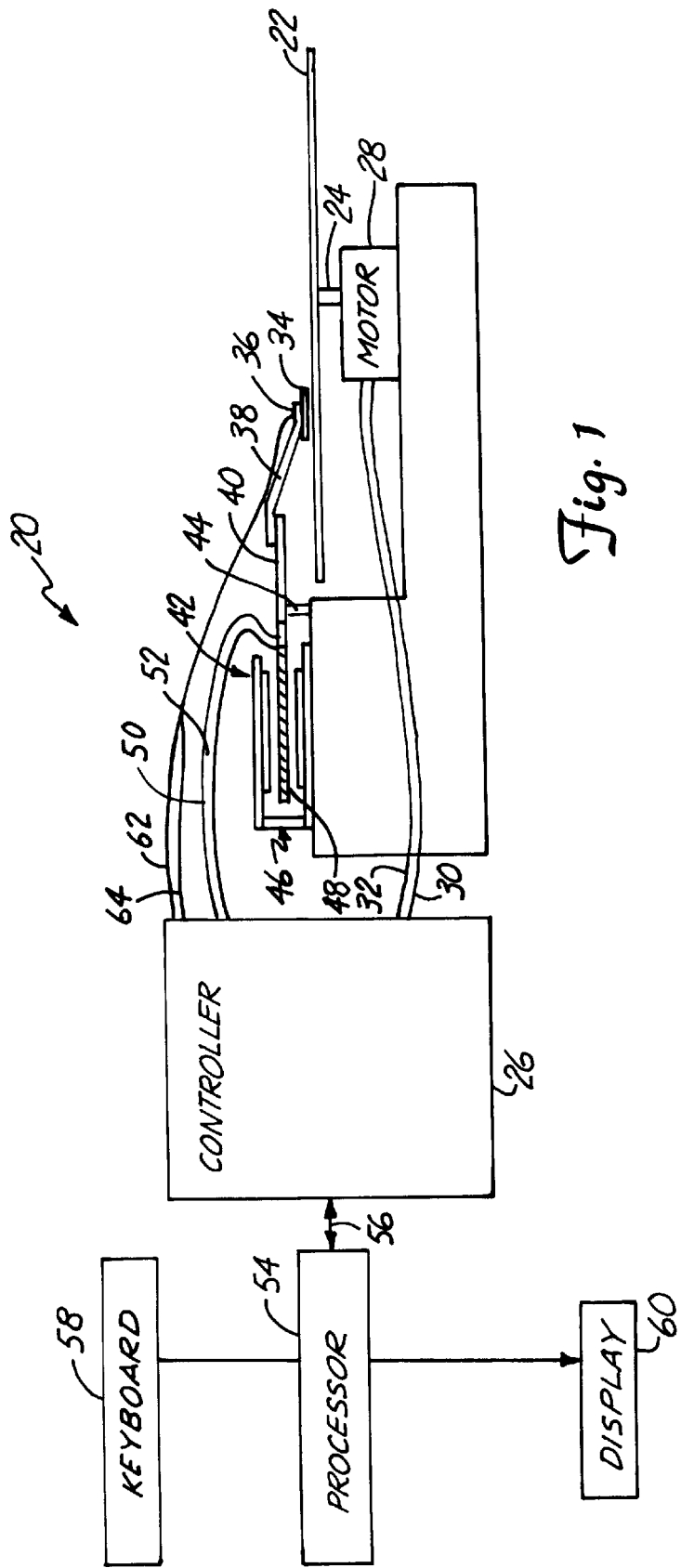
FIG. 1 is a composite block diagram and side view of a system for determining surface characteristics according to the present invention.

FIG. 1 is a combination block diagram and side view of a system 20 of the present invention for determining surface characteristics of a material. In system 20, a disc 22 spins about a spindle 24 under the control of controller 26 acting through motor 28. Controller 26 is connected to motor 28 through motor control lines 30 and 32.

The rotation of disc 22 causes a glide head 34 to lift off the surface of disc 22. Glide head 34 is positioned over the surface of disc 22 through a suspension assembly consisting of gimbal 36, flexure arm 38, load beam 40 and actuator 42. The suspension assembly pivots about pivot point 44 causing glide head 34 to move in an arc over the surface of disc 22.

Actuator 42 includes magnetic assembly 46 and magnetic coil 48. Magnetic coil 48 is formed on an actuator arm extending opposite of load beam 40 across pivot point 44. Conductors 50 and 52 are connected to magnetic coil 48 and to controller 26. Through conductors 50 and 52, controller 26 passes a current through magnetic coil 48 causing magnetic coil 48 to produce a magnetic field that interacts with the magnetic fields generated by the magnets of magnetic assembly 46. This interaction causes suspension assembly 20 to pivot about pivot point 44 and thereby moves glide head 34 in an arc across disc 22. The position of the suspension assembly is such that glide head 34 may be positioned at any radial position along disc 22.

The desired speed for motor 28 and the desired location for glide head 34 is communicated to controller 26 by a processor 54 that communicates to controller 26 through a bi-directional bus 56. Processor 54 is able to execute several test routines and is able to instruct controller 26 to vary the speed of disc 22 and the position of glide head 34 in accordance with those test routines. Processor 54 receives user input from keyboard 58 and produces perceivable output at display 60. Note that the blocks of FIG. 1 are not to scale.

Embedded in glide head 34 is a sensor (not shown in FIG. 1 for simplicity) that affects an electrical signal when glide head 34 impacts a portion of disc 22. This electrical signal is carried on conductors 62 and 64, which are connected to controller 26. Controller 26 conditions the signal carried on conductors 62 and 64 by, for example, converting the signal from an analog to a digital signal before passing the digitized signal along bi-directional bus 56 to processor 54. Processor 54 may store this sensor data for later use or may display the data directly on display 60.

Figure 2:
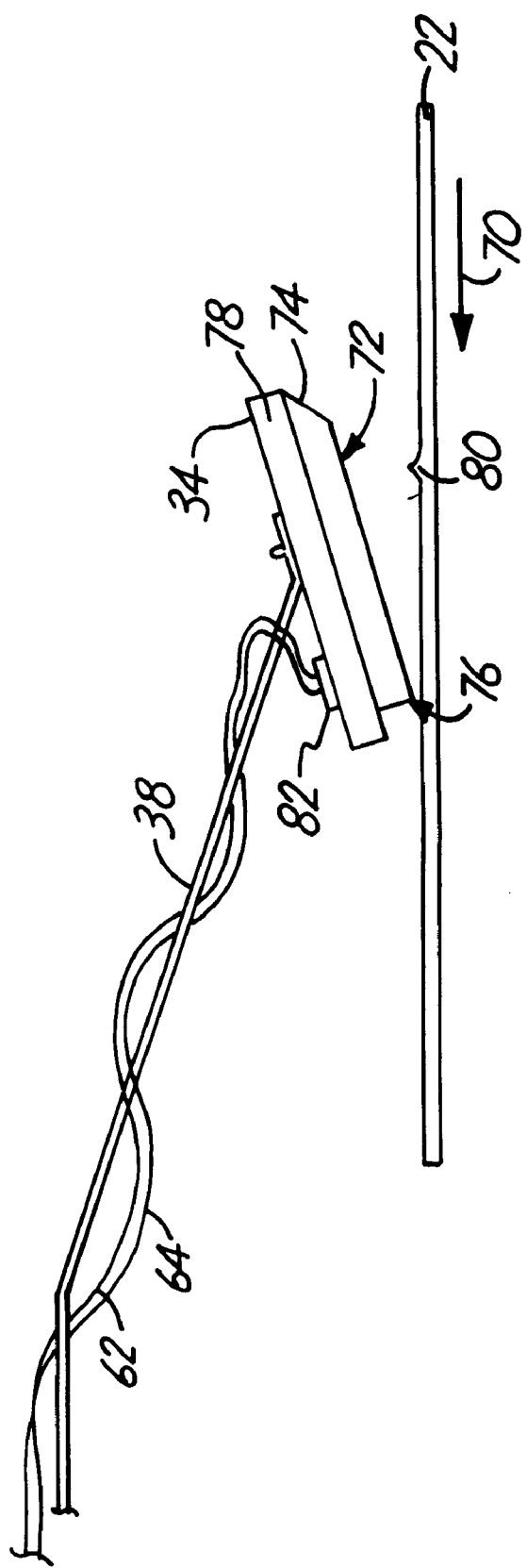
FIG. 2 is an enlarged view of the glide head of the present invention over a disc.

FIG. 2 is an enlarged view of glide head 34, flexure arm 38 and a portion of disc 22 of FIG. 1. In FIG. 2, disc 22 is rotating relative to glide head 34 in direction 70. The movement of disc 22 causes a thin film of air to move with disc 22 in direction 70 causing glide head 34 to lift from the surface of disc 22.

Glide head 34 includes rail 72 having leading tapered surface 74 and impact edge 76. Rail 72 is connected to and preferably is integrally formed with a body 78 of glide head 34.

Glide head 34 is constructed such that rail 74 and body 78 cause glide head 34 to fly over disc 22 in a front-up position such that impact edge 76 is the closest portion of glide head 34 to disc 22. Preferably, impact edge 76 is parallel to disc 22 in the direction perpendicular to the page of FIG. 2. Because impact edge 76 is closest to disc 22, asperities such as asperity 80 of FIG. 2 will strike impact edge 76 before hitting other portions of glide head 34. When impact edge 76 strikes such asperities, a sensor 82 located on top of body 78 changes an electrical signal on conductors 62 and 64 in response to the impact.

In the present invention, impact edge 76 is preferably formed through ion etching, which reduces the stress on impact edge 76, making it more resilient to impacts. In addition, it is preferable that glide head 34 be constructed from a single phase material such as silicon carbide (SiC) because such single phase materials are less susceptible to chipping than multi-phase materials.

Figure 3:
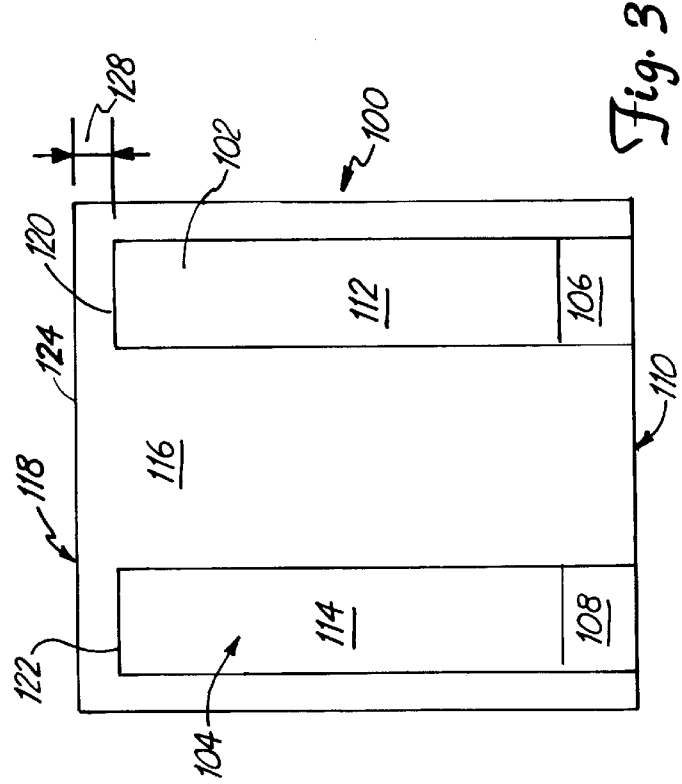
FIG. 3 is a bottom view of a first embodiment of the glide head of the present invention.

FIG. 3 is a bottom view of a glide head 100 of the present invention. Glide head 100 has two rails, 102 and 104 that have leading tapered surfaces 106 and 108, respectively. Tapered surfaces 106 and 108 are in contact with leading edge 110 of glide head 100. Rails 102 and 104 also have glide surfaces 112 and 114, respectively. Glide surfaces 112 and 114 are raised from and parallel to lift surface 116 of body 118. Rails 102 and 104 have impact edges 120 and 122, respectively, formed at the trailing edges of the rails. Impact edges 120 and 122 are raised from lift surface 116 of body 118 and are forward from trailing edge 124 of body 118 by a distance 128, which is preferably 2 to 5 microns.

Before ion etching, rails 102 and 104 extend to trailing edge 124 of body 118. Preferably, ion etching removes enough material from rails 102 and 104 to form impact edges 120 and 122 and to make the surfaces from rails 102 and 104 to trailing edge 124 co-planar with lift surface 116. Such ion etching reduces the stress on impact edges 120 and 122 while ensuring that impact edges 120 and 122 are the only portions of glide head 100 that strike asperities on the surface of the disc.

Figure 4:
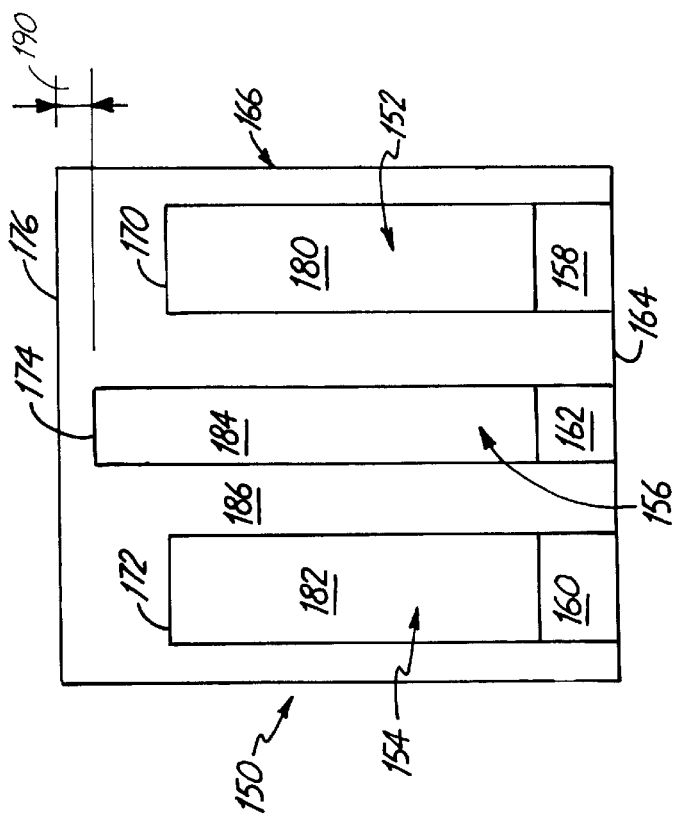
FIG. 4 is a bottom view of a second embodiment of the glide head of the present invention.

FIG. 4 shows a glide head 150, which is a second embodiment of the present invention. Glide head 150 has side rails 152 and 154 and center rail 156. Side rails 152 and 154 and center rail 156 have leading tapered surfaces 158, 160 and 162, respectively. Each of the tapered surfaces connects to leading edge 164 of body 166. Side rails 152 and 154 end at trailing edges 170 and 172, respectively. Center rail 156 ends at impact edge 174. Trailing edges 170 and 172 and impact edge 174 are forward from and raised from trailing edge 176 of body 166. Preferably, trailing edges 170 and 172 are further forward from trailing edge 176 than impact edge 174 is from trailing edge 176.

Side rails 152 and 154 and center rail 156 each have glide surfaces 180, 182 and 184, respectively, that are raised above lift surface 186 of body 166. Glide surfaces 180, 182 and 184 are preferably co-planar to each other and parallel to lift surface 186. In this configuration, glide head 150 will fly over a disc such that impact edge 174 will be the closest portion of glide head 150 to the disc.

Before impact edge 174 is formed, center rail 156 extends to trailing edge 176 of body 166. To create impact edge 174, center rail 156 is ion etched so as to remove a portion of center rail 156 and to make the area between center rail 156 and trailing edge 176 co-planar with lift surface 186 of body 166. The amount of center rail 156 that is ion etched is denoted as distance 190 in FIG. 4. Preferably, distance 190 is between 2 and 5 microns.

Figures 1, 5:
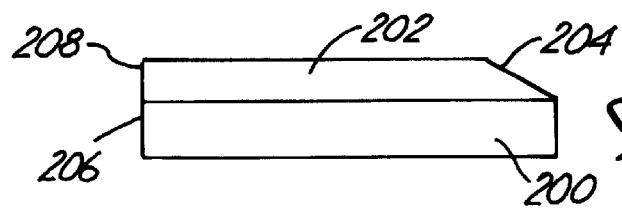
Figures 2, 5:
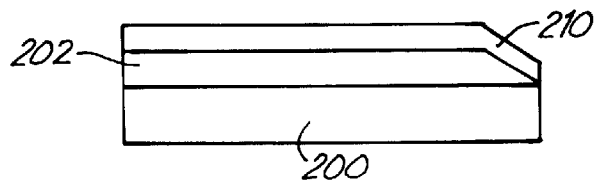
Figures 3, 5:
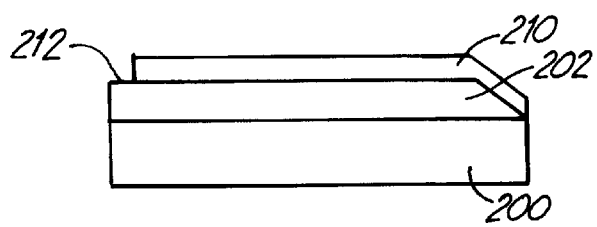
Figures 4, 5:
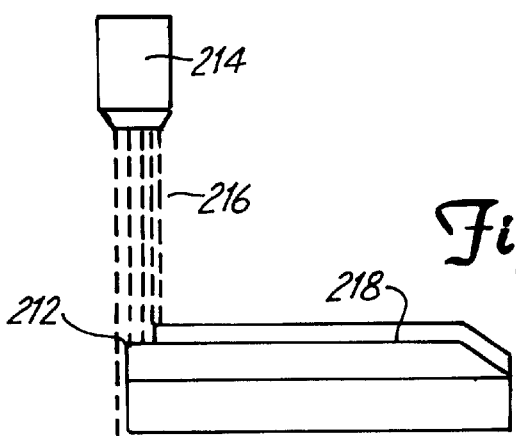
Figure 5:
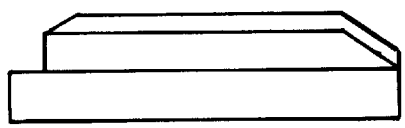
Figures 5, 6:
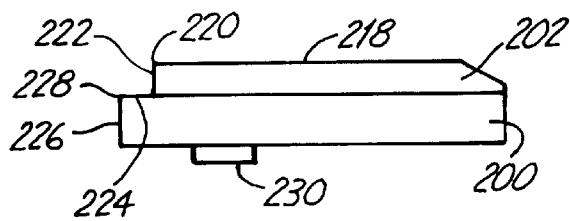

FIGS. 5-1 through 5-6 depict a plurality of stages in a method of the present invention for producing a glide head of the present invention. In FIG. 5-1, a glide head body 200 and a rail 202 have been formed from a substrate using mechanical abrasion techniques such as diamond grinding. The mechanical abrasion creates tapered leading edge 204 on rail 202 as well as trailing surface 206 and trailing edge 208. The mechanical abrasion used to form trailing surface 206 produces stress on trailing edge 208.

FIG. 5-2 shows a second step in the method of producing a glide head in which a photoresist 210 has been deposited on top of rail 202. In FIG. 5-3, photoresist 210 has been exposed to a masked pattern of light and developed to produce a patterned photoresist. Masking produces exposed and unexposed areas on photoresist 210. The masking may be accomplished by depositing a masking layer on top of photoresist 210 before exposure or by passing light through a mask that is distal from photoresist 210. After photoresist 210 has been exposed, the photoresist is developed using a chemical developer to remove those portions of photoresist 210 that are weakly bonded to rail 202. After photoresist 210 has been developed, an area of rail 202 near trailing edge 208 is exposed. This exposed area 212 is the area to be removed by ion etching. At this point, the photoresist is hardened to increase its resilience to ion etching.

In FIG. 5-4, the glide head and photoresist are exposed to ion bombardment. An ion source 214 accelerates an ion stream 216 toward exposed area 212. Preferably, ion stream 216 is directed toward exposed area 212 in a direction perpendicular to a glide surface 218 of rail 202.

The ion etching of FIG. 5-4 can include simple ion milling in which the bombardment of the ions removes rail material. It may also include reactive ion etching wherein a gas such as $CF_4$ reacts with the rail material and thereby etches away rail material.

FIG. 5-5 shows the results of the ion etching performed in FIG. 5-4. After the ion etching is complete, photoresist 210 is removed leaving rail 202 and body 200 as shown in FIG. 5-6. Rail 202 has impact edge 220 which is formed at the edge between glide surface 218 and trailing surface 222. Trailing surface 222 intersects with lift surface 224 of body 200. Lift surface 224 intersects with trailing surface 226 of body 200 to form secondary trailing edge 228. After impact edge 220 has been formed, a sensor 230 is formed on body 200. The sensor may either be bonded to body 200 or deposited on body 200 through known photolithography processes. Although it is preferred that sensor 230 be placed on top of body 200, opposite the air bearing surface, the sensor may be placed on trailing surface 226.

Although the present invention has been described with reference to preferred embodiments, workers skilled in the art will recognize that changes may be made in form and detail without departing from the spirit and scope of the invention.

What is claimed is:

1. A glide head for determining surface characteristics of a material, the glide head comprising:
   a body, for being positioned proximate to a surface of the material;
   an impact edge extending from the body toward the material, the impact edge formed through ion etching of a single phase material; and
   a sensor, mounted on the body, the sensor capable of sensing impacts between the impact edge and portions of the surface of the material.

2. The glide head of claim 1 wherein the impact edge is formed on a rail extending from the body.

3. The glide head of claim 2 wherein the rail is formed through frictional abrasion.

4. The glide head of claim 2 wherein the rail has a first surface and a second surface that connect at the impact edge, the first surface perpendicular to the second surface along the impact edge.

5. The glide head of claim 4 wherein the impact edge is parallel to the general plane of the surface of the material proximate the impact edge.

6. The glide head of claim 5 wherein the second surface of the rail intersects a first surface of the body.

7. The glide head of claim 6 where in the first surface of the body intersects a second surface of the body at a secondary trailing edge that is parallel to the impact edge, the impact edge for being positioned closer to the material than the secondary trailing edge.

8. The glide head of claim 1 wherein ion etching comprises ion milling.

9. The glide head of claim 1 wherein ion etching comprises reactive ion etching.

10. A method of forming a glide head useful in determining surface characteristics of a surface of a material, the method comprising:
    forming a body from a single phase material;
    combining a sensor with the body, the sensor capable of creating a signal based on impacts between the body and the surface of material; and
    ion etching a portion of the body to form an impact edge, the impact edge formed to be closer to the surface of the material than any other portion of the glide head when determining surface characteristics of the material.

11. The method of claim 10 wherein the body comprises a rail and the rail is ion etched to form an impact edge.

12. The method of claim 10 wherein ion etching comprises ion milling.

13. The method of claim 12 wherein ion milling comprises:
    coating a portion of the body with a photoresist;
    exposing the photoresist to masked light, the masked light exposing some portions of the photoresist to light and not exposing other portions of the photoresist to light;
    removing portions of the photoresist that are not bonded to the body to create exposed areas of the body; and
    bombarding the photoresist and exposed areas of the body with ions, the ions removing portions of the exposed areas of the body.

14. The method of claim 13 wherein some of the ions remove portions of the exposed areas of the body through chemical reactions.

15. A system for determining surface characteristics of a material, the system comprising:
    means for moving the material;
    a glide head having an impact edge formed from a single phase material through ion etching;
    a sensor, in contact with the glide head, the sensor for affecting a sensor electrical signal when the impact edge contacts a portion of a surface of the material; and
    output means, coupled to the sensor for creating a perceivable output based on the sensor electrical signal.

16. The system of claim 15 wherein the glide head further comprises a rail, the impact edge formed on the rail.

17. The system of claim 15 wherein the moving material creates a fluid flow that provides lift to the glide head to keep it off the surface such that the impact edge is the portion on the glide head closest to the surface of the material.

* * * * *